June 12, 1945. M. A. ELLIOTT 2,377,869
APPARATUS AND METHOD FOR MEASURING WORK
Filed Nov. 17, 1942 2 Sheets-Sheet 1
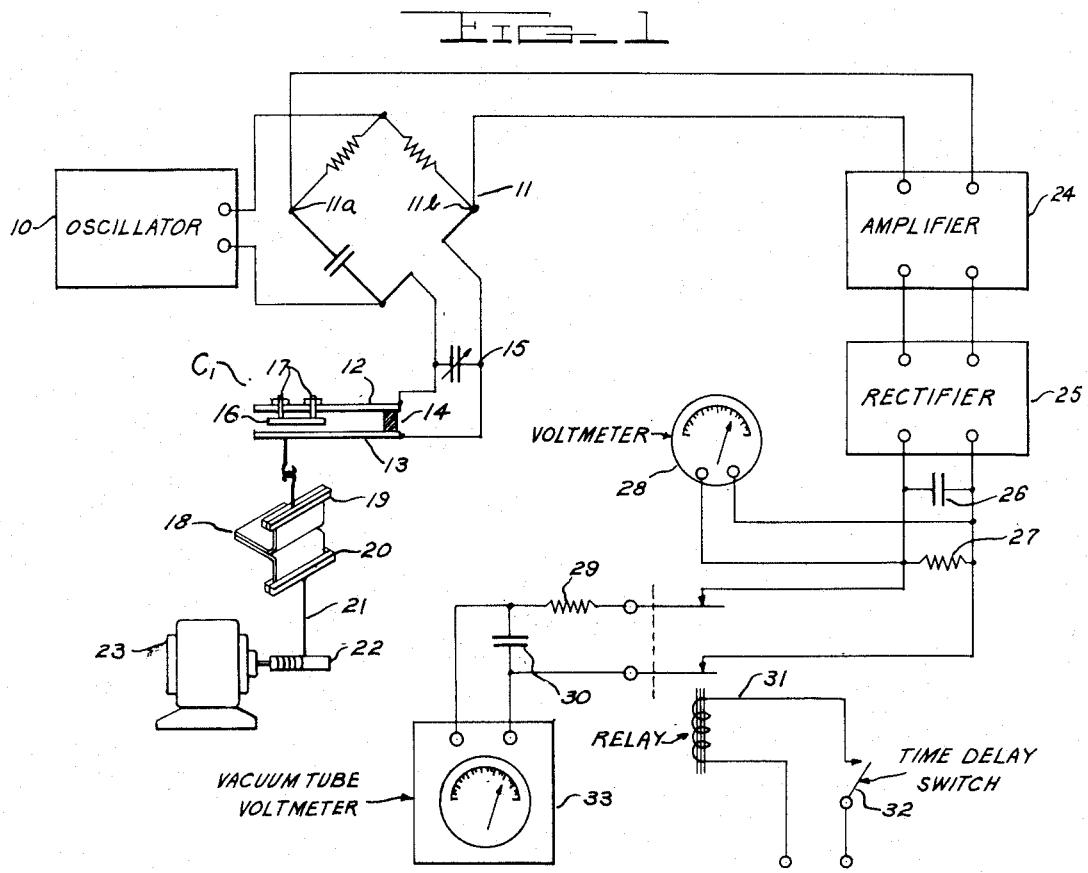
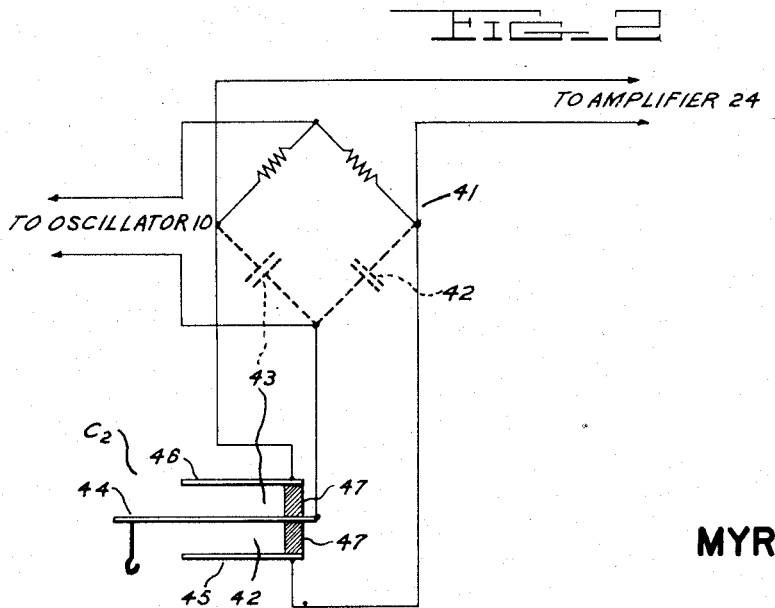
Inventor
MYRON A. ELLIOTT
By *J. J. Fitzgerald*
Attorney

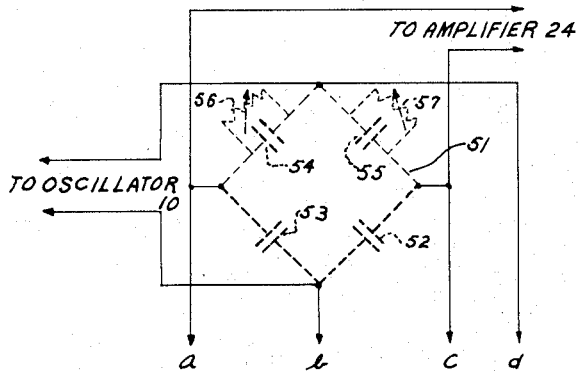
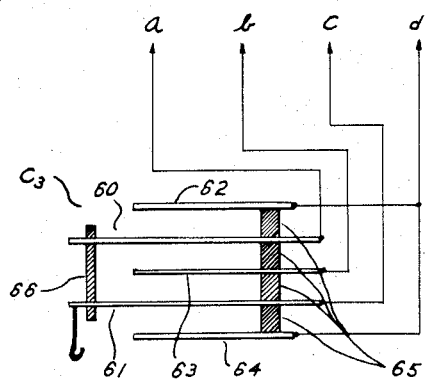
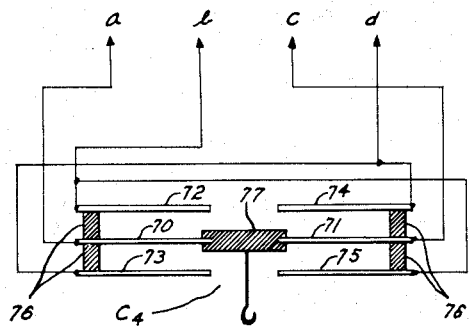
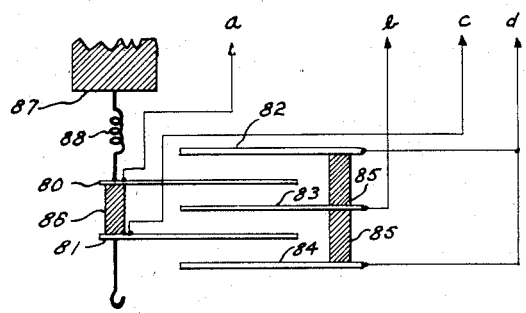
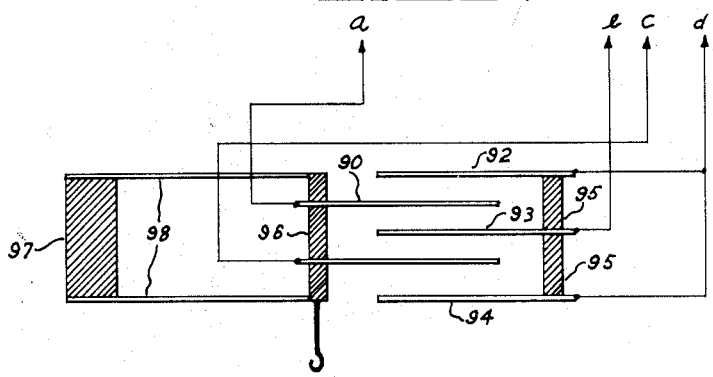
Inventor
MYRON A. ELLIOTT

Patented June 12, 1945

2,377,869

UNITED STATES PATENT OFFICE 2,377,869

APPARATUS AND METHOD FOR MEASURING WORK

Myron A. Elliott, Washington, D. C.

Application November 17, 1942, Serial No. 465,938

9 Claims. (Cl. 73—95)

(Granted under the act of March 3, 1883, as amended April 30, 1928; 370 O. G. 757)

This invention relates to apparatus for measuring a variable force over a period of time, and it is more particularly directed to an apparatus and method for measuring this force over a distance through which it acts, and applications of the method to the testing of materials.

In the testing of many materials it is customary to apply a force to the material until failure occurs or the material yields to some degree. In such cases it is often difficult, if not impossible, to apply a steady force or a uniformly increasing one, or to control the rate of yield due to irregularities in the specimen. Where the force varies greatly or where accurate measurements are desired the usual balance is not a satisfactory indicator of the force because, first, it will not give an average reading or a summation of readings over a period of time and, second, the movement of the balance itself is sufficient to vary the rate of yield to such an extent that the readings are not accurate or reproducible.

This invention provides an apparatus for measuring such forces with a high degree of accuracy, and since it does not appreciably affect the rate of yield of the specimen under test it is possible to control the applied force or rate of yield within narrow limits. This apparatus measures the force directly, or as it is applied over a predetermined period of time, either as an average value or as an integral, depending on whether the period of time during which the force is applied is taken as unity or as a sum of smaller units. A modification of the invention includes means for controlling the rate of yield of the specimen so that, in this case, the apparatus measures either the average force applied over a given distance or the integral of the force taken over the same distance, which is the measure of the work done on the specimen. The invention also includes a specially designed multiple condenser for use in the measuring apparatus, and a method for determining properties of a material by means of this apparatus. In particular, the method includes the testing of the deep drying properties of insulating varnishes.

The invention involves causing the force applied to the specimen to produce an electric signal as a function thereof, the signal so produced being measured by indicating means (or it may be recorded), or the signal may be employed to charge a condenser through a suitable resistance over a predetermined period of time, and the accumulated charge on the condenser measured. Where the rate of yield of the specimen is also controlled, the accumulated charge on the condenser is a measure of the work done on the specimen.

In order that the invention may be clearly understood, it is described in detail with reference to the accompanying drawings, in which:

Fig. 1 is a diagram of the apparatus showing the electrical circuit employed, using a conventional capacitance bridge and vacuum tube voltmeter;

Fig. 2 is a diagram of a variation of the capacitance bridge of Fig. 1, utilizing a two-section force measuring condenser;

Fig. 3 is a diagram of another variation of the capacitance bridge of Fig. 1, designed to use a four-section force measuring condenser;

Fig. 4 is a diagram of a four-section force measuring condenser to be used in the circuit of Fig. 3;

Fig. 5 shows a modification of the four-section condenser of Fig. 4;

Fig. 6 shows a variation in the structure of the force measuring condenser shown in Fig. 4; and Fig. 7 shows another variation in the structure of the force measuring condenser shown in Fig. 4.

Referring to Fig. 1, an oscillator 10 generates an alternating current signal which is applied to a capacitance measuring bridge 11 in conventional manner. The frequency of the signal is not important, although a frequency of about 1000 cycles is usually employed for bridges of this type. One side of the "unknown" leg of the bridge 11 is connected to a fixed metal bar 12. The other side of the "unknown" leg is connected to a metal bar 13 which is rigidly supported at one end by an insulating block 14 and positioned opposite the bar 12. In this way the bars 12 and 13 form a variable condenser $C_1$, the capacitance of which is measured by the bridge 11. A small padding condenser 15 is connected across the bars 12 and 13 to aid in balancing the bridge as described further on. The bar 12 carries a vernier adjustment device consisting of a smaller metal bar 16 connected by means of adjustable screws 17. By varying the spacing between the bar 13 and bar 16 the capacitance measured by bridge 11 may be adjusted.

A sample 18 to be stretched, torn, or otherwise subjected to failure is fastened between clamps 19 and 20 which may be of any suitable design. The clamp 19 is suspended from the bar 13, and a rope or belt 21, fastened to the clamp 20, passes around a spool or drum 22 attached (through suitable reducing gears) to a motor 23. The motor 23 is operated at a constant speed (or substantially so) so that the sample 18 is torn or stretched at a uniform rate. The deflection of the bar 13 is proportional to the tension to which the sample 18 is subjected, as the tension is not allowed to deflect the bar 13 past its elastic limit.

In order to avoid excessive play in testing the sample 18, the bar 13 is preferably of sufficient rigidity that its deflection for the maximum tension to be measured is not greater than about $\frac{1}{100}$ of the free length of the bar 13, although this is only an approximate value.

When the sample 18 is in place and ready for testing, the bridge 11 is balanced, using the padding condenser 15 if necessary to bring the voltage appearing across terminals 11a and 11b to zero. When the motor 23 is started the bar 13 deflects away from the bar 12 according to the resistance to separation of the sample 18, thus unbalancing the bridge 11 and causing a voltage to appear across the terminals 11a and 11b. This voltage is approximately proportional to the deflection of the bar 13 within the limits employed.

The voltage across the terminals 11a and 11b is supplied to the input of a linear amplifier 24, the output of which is rectified in the rectifier 25, and filtered by a condenser 26. A load resistance 27 is connected across the output of the rectifier 25 so that variations in the indicating circuit load will not disturb the operation of the amplifier 24. A direct current voltmeter 28 is also connected across the rectifier output to aid in adjusting the gain of the amplifier 24, but it is not essential. From the load resistance 27 the rectifier output voltage is connected across a resistance 29 in series with a condenser 30, through the contacts of a relay 31. The relay 31 is energized by any convenient electrical source in series with a time delay switch 32. A voltmeter 33 is connected across the condenser 30 to measure the total charge thereof. Since appreciable current cannot be drawn from the condenser 30 without greatly reducing the charge, the voltmeter 33 should be of the vacuum tube type, or it may be a heavily damped galvanometer of the type known as a coulomb meter or ballistic galvanometer. If desired, the output of the bridge can also be measured directly without rectification by the use of a watt-hour type of meter.

The resistance 29 and the condenser 30 constitute the "measuring" part of the apparatus and their values are selected so that the condenser 30 can be charged to only a small fraction of the output voltage appearing across the load resistance 27 under maximum deflection of the bar 13 during the time interval over which the tension on the sample 18 is to be measured. The particular values of the resistance 29 and the condenser 30 will depend on a number of obvious factors, but for a maximum rectifier output of about 30 volts it has been found that a resistance of 15 megohms for the resistance 29 and a capacity of 50 microfarads for the condenser 30 permits the condenser 30 to accumulate a charge of about one volt in about 25 seconds. The rate at which the condenser 30 charges is proportional to the voltage drop across the resistance 29, which, in turn, equals the voltage developed across the load resistance 27 minus the charge on the condenser 30. Therefore, a total maximum charge of about one volt on the condenser 30 is small enough to be neglected, and it may be said that the charge on the condenser 30 is proportional to the product of the rectifier output voltage appearing across the load resistance 27 and the charging time. Thus if the apparatus is calibrated with the time interval at which the delay switch 32 operates, as unity, the apparatus measures the average value of force applied to the specimen. However, the apparatus may be calibrated for any time interval shorter than the period of the delay switch 32, and the resulting charge on the condenser 30 will be a summation of the force applied over the period of the delay switch 32, or a measure of the work done on the sample if the rate of yield is constant. By making the calibration time interval small the charge on the condenser 30 becomes the integral of the force applied, taken over the given period of time, or through a given yield distance of the specimen.

It is obviously not necessary that the amplification of the amplifier 24, or the change in capacitance of the condenser formed by the bars 12 and 13 with applied force, be linear, because the apparatus is most easily calibrated by suspending a known weight from the bar 13 and observing the charge accumulated by the condenser 30 in a given period of time, and for a given setting of the amplifier gain.

Referring to the Figs. 1 and 2, a variation of the capacitance bridge 11 of Fig. 1 is shown which develops a greater signal voltage for the same deflection of the bar 13. Instead of employing only one variable condenser, the bridge 41 has two condensers one in each of two adjacent legs, the effective positions of which are indicated by dotted lines and condensers 42 and 43. The condensers 42 and 43 are formed by a two-section variable condenser $C_2$, which is designed to vary the capacitances of the condensers 42 and 43 in opposite directions as a bar 44 is deflected. That is, the condenser $C_2$ comprises two rigid metal bars or plates 45 and 46 between which is the flexible bar 44 separated by insulators 47. As the bar 44 is deflected toward the bar 45 it moves away from the bar 46, thus increasing the capacitance of the condenser 42 and decreasing that of the condenser 43. Thus the bridge 41 is moved further out of balance than it would be if the condenser 43 remained fixed, and a proportionately larger signal is transferred to the amplifier 24. Where exact balancing of the bridge 41 is necessary, padding condensers may be placed in the circuit where the condensers 42 and 43 are shown.

Referring to Figs. 1 and 3, another variation of the capacitance bridge 11 of Fig. 1 is shown which develops the maximum signal voltage across the input of the amplifier 24, and is consequently more sensitive than either of the bridges 11 and 41 already described. In Fig. 3 the bridge 51 contains four variable condensers, one in each leg thereof, the effective positions of which are shown by the dotted lines and condensers 52, 53, 54, and 55. Where accurate balancing of the bridge is desired, two padding condensers may be inserted in the circuit where the condensers 52 and 53, or 54 and 55, are shown. Only two padding condensers are necessary, although they could be placed in all four legs. In addition it is sometimes necessary to balance out a resistive component, and this may most easily be done by inserting two variable resistances 56 and 57 shown in dotted lines. The four condensers 52, 53, 54, and 55 are formed by a four-section variable condenser, two variations of which are shown as condensers $C_3$ and $C_4$ of Figs. 4 and 5 respectively. The proper connections between the bridge 51 and the condensers $C_3$ and $C_4$ are made by connecting the lines $a$, $b$, $c$, and d of Fig. 3 with the correspondingly lettered lines of Figs. 4, 5, 6, or 7.

Referring to Fig. 4, two flexible elements 60 and 61 are spaced from three rigid elements 62, 63, and 64 by insulators 65 at one end. At the other end the elements 60 and 61 are held in equal spacing by an insulating clamp 66 so that as the element 61 is deflected, the element 60 is equally deflected in the same direction. By connecting the elements 62 and 64 together a four section condenser C₃ is formed, alternate sections of which vary in capacitance in the same direction and adjacent sections of which vary in capacitance in opposite directions, on deflection of the elements 60 and 61. Therefore, by connecting the condenser C₃ in the bridge circuit of Fig. 3 as shown, a capacitance bridge is formed which is thrown the farthest out of balance (and hence gives the greatest signal to the amplifier 24) for any given deflection of the elements 60 and 61 caused by the force being measured.

Referring to Fig. 5, a modification of the four-section condenser C₃ of Fig. 4 is shown as a condenser C₄. In this modification two flexible elements 70 and 71 are placed opposite each other, each between rigid elements 72, 73 and 74, 75 respectively. The respective elements are supported and separated from one another by insulators 76. The flexible members 70 and 71 are deflected in the same direction simultaneously by means of an insulating clamp 77, when the force to be measured is applied thereto. With the elements 72 and 75, and 73 and 74, respectively, connected together, as is shown in Fig. 5, a four-section condenser is formed, opposite sections of which vary in capacitance in the same direction and adjacent sections vary in capacitance in opposite directions as a force is applied to the clamp 77 and the elements 70 and 71 are deflected. The condenser C₄ is connected to the bridge 51 of Fig. 3 in the same manner as described with respect to the condenser C₃ of Fig. 4.

In Fig. 6 there is shown a variation in construction of the four-section condenser C₃ of Fig. 4. Where it is undesirable to construct the flexible elements of the condenser of sufficient stiffness to keep from excessive bending when the force is applied thereto, it is convenient to have some other elastic device take up the force and merely have the condenser capacitance vary in accordance with the strain of the elastic device as if the condenser elements were absorbing the force themselves. This is easily accomplished in a number of ways. As shown in Fig. 6, stationary elements 82, 83, and 84 are supported by insulators 85 in the same way as the elements 62, 63, and 64 are supported by the insulators 65 in Fig. 4. However, movable elements 80 and 81, which correspond to the flexible elements 60 and 61 of Fig. 4 are separated by an insulator 86 and supported from a fixed member 87 by a relatively heavy spring 88, or other suitable resilient device. When a force is applied to the members 80 and 81 they will move toward and away from the respective stationary members in the manner described with respect to Fig. 4, thus accomplishing the same result.

In Fig. 7 there is shown another variation in construction of the four section condenser C₃ of Fig. 4. In this variation the spring element, or elastic member, which absorbs the force applied to the condenser comprises a pair of flexible leaves 98 which are fastened to a rigid element 97 and to an insulating support 96. As is obvious from the drawings, the remaining part of the condenser is constructed identically to the condenser shown in Fig. 6 and corresponding parts have similar numbers.

An advantage of this construction over those shown in Figs. 4, 5, and 6 is that the condenser leaves 90 and 91 always remain parallel to the leaves 92, 93, and 94 during deflection, and they are prevented from turning or rotating out from between the leaves 92, 93, and 94.

It is obvious that other types of elastic support than the spring 88 or the leaves 98 may be used, such as compression members, and the like, thus causing the application of the force to the elements 80 and 81 or 90 and 91 to be reversed. Similarly the condensers of Figs. 1, 2, and 5 may be constructed with separate elastic means for taking up the applied force, thus eliminating the need for flexible elements in the condenser. Also, by this construction, the condenser may be made of extremely light materials.

Many of the various uses of the apparatus described and method of measuring forces therewith will be apparent. However, the apparatus was particularly developed in connection with a method for measuring the deep-drying properties of insulating varnishes. This method comprised coating two flexible sheets, such as flannel or other tightly woven cloth, with the varnish to be tested, placing them together under predetermined pressure (usually 10 lbs. per square inch) between steel slabs with copper foil placed between the cloth and the steel, and baking the varnish under this pressure under controlled conditions of time and temperature. After baking, the laminated cloth was removed from between the slabs and the copper foil peeled off. The two pieces of cloth were then slightly separated and inserted between the clamps 19 and 20 of Fig. 1 and slowly drawn apart at a predetermined speed. The average force required to separate the pieces of cloth, which was measured in the manner described with respect to Fig. 1, was a measure of the degree of hardening or "deep-drying" of the varnish away from exposed edges of the sample.

Many other variations in the apparatus described and methods in which it may be employed will be obvious to those skilled in the art, and the invention should not be limited other than as defined by the appended claims.

The invention described herein may be manufactured and used by or for the Government of the United States of America for governmental purposes without the payment of any royalties thereon or therefor.

I claim:

1. Apparatus for measuring a force which comprises, a capacitance bridge including at least one variable condenser, means for unbalancing said bridge by varying the capacitance of said variable condenser in accordance with said force, an alternating current signal source connected to said bridge, converting means connected across said bridge so as to convert the signal produced by unbalance of said bridge into a direct current signal, a resistance and a second condenser connected in series to said converting means to receive said direct current signal, means for controlling the time duration of said signal, and means connected across said second condenser to measure the accumulated charge thereon.

2. Apparatus for measuring a force which comprises, a capacitance bridge including a variable condenser in each arm thereof, means for unbalancing said bridge by varying the capacitance of the condensers in opposite arms thereof in the same direction and varying the capacitance of the condensers in adjacent arms in opposite directions in accordance with said force, an alternating current signal source connected to said bridge, converting means connected across said bridge so as to convert the signal produced by unbalance of said bridge into a direct current signal, a resistance and a second condenser connected in series to said converting means to receive said direct current signal, means for controlling the time duration of said signal, and means connected across said second condenser to measure the accumulated charge thereon.

3. Apparatus for measuring a force which comprises, a balanced capacitance bridge including at least one variable condenser, said condenser comprising a plurality of conducting surfaces positioned opposite one another and including at least one stationary member and one movable member, means for applying a force to said movable member to cause it to move toward or away from said rigid member thereby to change the capacitance of said condenser and unbalance said bridge in accordance with said force, an alternating current signal source connected to said bridge, an amplifying channel connected across sair bridge and a rectifier connected to the output of said amplifying channel to produce an amplified direct current signal according to the unbalance of said bridge, a resistance, a second condenser and a time switch connected in series to said rectifier to receive said amplified direct current signal for a predetermined period of time, and means connected across said second condenser to measure the accumulated charge thereon.

4. Apparatus for measuring a force which comprises, a balanced capacitance bridge including four variable condensers one in each arm thereof; said variable condensers comprising a plurality of conducting surfaces including at least three stationary members and two movable members positioned between said stationary members; means for applying a force to said movable members to cause them to move toward at least one stationary member thereby to unbalance said bridge in accordance with said force, an alternating current signal source connected to said bridge, an amplifying channel connected across said bridge and a rectifier connected to the output of said amplifying channel to produce an amplified direct current signal according to the unbalance of said bridge, a resistance, a second condenser and a time switch connected in series to said rectifier to receive said amplified direct current signal for a predetermined period of time, and means connected across said second condenser to measure the accumulated charge thereon.

5. Apparatus for measuring a variable force over a given distance through which it acts which comprises, a balanced capacitance bridge including at least one variable condenser, said condenser comprising a plurality of conducting surfaces positioned opposite one another and including at least one rigid member and one flexible member, tension means for applying said force to said flexible member to cause said flexible member to bend toward or away from said stationary member thereby to change the capacitance of said condenser and unbalance said bridge; said tension means comprising a first clamp connected to said flexible member and adapted to grip one end of a specimen to be tested, a second clamp adapted to grip the opposite end of said specimen, and power means cooperating with said second clamp and adapted to draw said second clamp away from said first clamp at a predetermined, substantially uniform rate; an alternating current signal source connected to said bridge, an amplifying channel connected across said bridge and a rectifier connected to the output of said amplifying channel to produce an amplified direct current signal according to the unbalance of said bridge, a resistance, a second condenser and a time switch connected in series to said rectifier to receive said amplified direct current signal for a predetermined period of time, and means connected across said second condenser to measure the accumulated charge thereon.

6. Apparatus as claimed in claim 5 wherein said balanced bridge contains a variable condenser in each arm thereof; said variable condensers comprising a plurality of conducting surfaces including at least three stationary members and two flexible members positioned between said stationary members, and said tension means is adapted to bend said flexible members toward or away from said stationary members.

7. A multiple variable condenser adapted for measuring forces applied thereto when connected in a capacitance bridge which comprises, four capacitance sections, said four sections comprising three stationary conducting surfaces and two flexible conducting surfaces positioned between said stationary surfaces, the outside stationary members being connected together to form said capacitance bridge so that, on deflection of said flexible surfaces in the same direction alternate sections of said bridge change capacitance in the same direction and adjacent sections change capacitance in opposite directions.

8. A multiple variable condenser adapted for measuring forces applied thereto when connected in a capacitance bridge which comprises four capacitance sections arranged in two groups of two each, each group comprising two stationary conducting surfaces and one flexible conducting surface therebetween, the corresponding surfaces of said sections in each group lying substantially in the same plane, said stationary surfaces of each group connected to the stationary surfaces of the other group lying on the opposite side of said flexible surfaces to form said capacitance bridge so that, on deflection of said flexible surfaces in the same direction alternate sections in said bridge change capacitance in the same direction and adjacent sections change capacitance in opposite directions.

9. Method of measuring a force over a given period of time which comprises causing said force to unbalance a capacitance bridge by applying said force to a movable surface of a condenser in said bridge, amplifying the signal caused by said unbalance, converting said amplified signal to a direct current signal, charging a fixed condenser through a resistance by means of said direct current signal for a predetermined period of time and measuring the accumulated charge on said fixed condenser.

MYRON A. ELLIOTT.